United States Patent Office 3,467,631
Patented Sept. 16, 1969

3,467,631
COPOLYMERS OF ETHYLENE, HIGHER ALPHA-OLEFINS AND CYCLOHEXENONORBORNENES
Alberto Valvassori, Nazzareno Cameli, and Guido Sartori, Milan, Italy, assignors to Montecatini Edison S.p.A., Milan, Italy, a corporation of Italy
No Drawing. Filed Sept. 15, 1965, Ser. No. 487,617
Claims priority, application Italy, Sept. 17, 1964, 19,889/64
Int. Cl. C08f *1/40, 21/00*
U.S. Cl. 260—79.5    21 Claims

ABSTRACT OF THE DISCLOSURE

There are provided modified linear, amorphous and vulcanizable ethylene/higher alpha-olefin copolymerizates made up of macromolecules containing sites of unsaturation resulting from the inclusion of cyclohexenonorbornenes in the starting monomer mixtures, and which are vulcanizable with the aid of conventional vulcanizing recipes based on sulfur.

---

This invention relates to a new class of substantially linear, amorphous, unsaturated, vulcanizable, high molecular weight olefinic copolymers, as well as to a process for preparing them with the aid of catalysts acting through an anionic coordinated mechanism.

Earlier, Natta et al. disclosed linear amorphous copolymerizates of ethylene and a higher alpha-olefin such as propylene or butene-1 which although being saturated have the properties of an unvulcanized elastomer and can be vulcanized to synthetic rubbers having excellent properties. However, because of their saturated character, said copolymerizates require the use of special vulcanizing aids and are not readily vulcanizable in practice by means of the sulfur-containing recipes commonly used in the vulcanization of rubber.

Earlier patents or patent applications of the present applicants or their coworkers have disclosed the preparation of amorphous, vulcanizable copolymers of ethylene and/or aliphatic alpha-olefins with hydrocarbon dienes or polyenes, which copolymers have the advantage of comprising sites of unsaturation rendering them capable of being vulcanizable by the conventional methods.

In particular, it is known to modify the Natta et al. linear amorphous and elastomeric ethylene/higher alpha-olefin copolymers by including dicyclopentadiene in the starting copolymerization mixture, whereby there are obtained terpolymerizates containing unsaturations deriving from the units of dicyclopentadiene and which can be cured with the aid of mixes based on sulphur and accelerants of the type used for unsaturated rubber.

A drawback, in practice, of those terpolymers is their low vulcanization rate, i.e., the slowness at which, and the extent to which, the vulcanization reaction proceeds under normal vulcanizing conditions when the amount of dicyclopentadiene is within economically feasible limits.

In order to insure a sufficient degree of vulcanization in a practicable vulcanization time, the terpolymer must have a high content of dicyclopentadiene, which is undesirable more especially from the economy viewpoint; otherwise, long vulcanization times, also not economically feasible, must be employed.

A primary object of this invention is to provide a wholly new group of vulcanizable amorphous copolymerizates which do not present, in practice, the aforesaid disadvantages and drawbacks. More specifically, one object of this invention is to provide new vulcanizable copolymerizates which, when mixed with the vulcanization aids or recipes commonly used in the rubber industry, are readily vulcanized to the desired extent in a short time, which is a marked advantage in the commercial production therefrom of vulcanized elastomers having good mechanical properties and chemical resistance.

These and other objects are achieved by this invention, which departs from the use of dicyclopentadiene for introducing sites of unsaturation into the linear, amorphous, elastomeric ethylene/higher alpha-olefin copolymerizates of Natta et al., and uses, instead for such purpose, one or more cyclo-alkenenorbornenes in which the cycloalkenic ring contains six carbon atoms, that is, cyclohexenonorbornenes whereby there are obtained modified Natta et al. linear, amorphous and vulcanizable ethylene/higher alpha-olefin copolymerizates which are not only sulfur-vulcanizable but have unexpectedly and markedly improved vulcanization rates.

We have found, in practice, that the best results are realized by using cycloalkenonorbornenes wherein the double bond of the cycloalkenic ring is substituted, for introducing the desired sites of unsaturation into the linear, amorphous and elastomeric saturated copolymers of ethylene and a higher alpha-olefin.

The terpolymers we obtain consist of macromolecules containing unsaturations and made up of monomer units deriving from each of the starting monomers.

Each monomer unit deriving from the polymerization of the diolefin still contains a free unsaturation, which constitutes a reactive point and renders the copolymer capable of partaking in various reactions. For instance, such free unsaturations permit curing of the copolymer by means of mixes of the type commonly used for unsaturated rubbers. Or the double bonds present in the macromolecules can, e.g., after oxidation with ozone, give rise to polar groups such as e.g. carbonylic groups, which can in turn constitute reactive groups for successive reactions and be utilized to improve the adhesion properties of the polymer.

Cyclohexenonorbornenes which can be copolymerized with ethylene and one or more aliphatic alpha-olefins, to obtain the new products of present invention, are prepared by Diels-Alder reaction between the norbornadiene and butadiene or homologs thereof, according to known methods.

Non-restrictive examples of cyclohexenonorbornenes the use of which is contemplated in the practice of this invention include:

5,6-cyclohexeno-3'-norbornene-2(tricyclo[6,2,1,0$^{2,7}$] undecadiene 4-9);
3',4'-dimethyl-5,6-cyclohexeno-3'-norbornene-2(4,5-dimethyl-tricyclo[6,2,1,0$^{2-7}$]undecadiene 4-9); and
3'-methyl-5,6-cyclohexeno-3'-norbornene-2(4-methyl-tricyclo[6,2,1,0$^{2-7}$]undecadiene 4-9).

The higher alpha-olefins useful in the preparation of the copolymers with ethylene and cyclohexenonorbornenes have the general formula R—CH=CH$_2$ wherein R is an alkyl group containing 1 to 6 carbon atoms. Particularly satisfactory results can be obtained by using propylene and/or butene-1.

By copolymerizing, according to the present invention, a mixture of said monomers such as, for instance, a mixture of ethylene, propylene and/or butene-1 and 3'-methyl-5-6-cyclohexeno-3'-norbornene-2, there is obtained a crude polymerizate which consists of macromolecules in each of which there are present randomly distributed monomer units of ethylene, propylene and/or butene-1 and methyl cyclohexeno norbornene.

The copolymers of the present invention can be defined as having a linear structure, that is they are essentially free of long branchings, as shown by the fact that they possess properties, in particular a viscous behavior, which are practically identical to those of known linear copolymers, e.g. of an ethylene-alpha-olefin copolymer.

The new copolymers herein described have a molecular weight higher than 20,000 determined viscosimetrically. The intrinsic viscosity (measured in tetralin at 135° C. or in toluene at 30° C.) is higher than 0.5. The composition of the copolymers can be defined as homogeneous, as shown by the fact that well-vulcanized products can be easily obtained, e.g. in the case of an ethylene/propylene/methylcyclohexeno norbornene terpolymer, by using the techniques commonly employed for curing unsaturated rubbers, preferably low unsaturation rubbers, such as butyl rubber. This also shows that the unsaturations are well distributed along the chain. The terpolymers as such are completely soluble in boiling n-heptane, whereas the vulcanizates obtained therefrom are completely insoluble in organic solvents, in particular in aliphatic hydrocarbons, and are only swollen to a limited extent by some aromatic solvents. The vulcanizates, moreover, show a very good mechanical resistance and low residual sets after break.

Because of their good mechanical characteristics, the elastomers resulting from the vulcanization of the present terpolymerizates can be employed advantageously for all purposes for which natural and synthetic rubbers are used, such as, for instance, in the manufacture of pipes, inner tubes, foils, elastic threads, gaskets, etc.

The copolymers can be extended or plasticized with hydrocarbon oils; although paraffinic or naphthenic oils are preferably employed, aromatic oils can also be used.

The copolymerizates of this invention have a higher vulcanization rate than known copolymers and more particularly than the known copolymers of ethylene, propylene and dicyclopentadiene, and the highest values of the moduli are reached in far shorter times than when terpolymers containing monomer units of dicyclopentadiene are cured.

The terpolymerizates are obtained by means of catalytic systems specially selected from those which promote polymerization reactions by anionic coordinated mechanism. Catalytic systems which can be used in the process which is one aspect of the present invention are highly dispersible, amorphous colloidally dispersible or completely soluble in the hydrocarbons which can be utilized as copolymerization medium, such as aliphatic, cycloaliphatic and aromatic hydrocarbons, and are prepared from beryllium or aluminum organometallic compounds and vanadium compounds.

The organometallic compounds used in preparing the catalyst are preferably selected from the group consisting of: beryllium dialkyls, beryllium alkylhalides, beryllium diaryls, aluminum trialkyls, aluminum dialkylmonohalides, aluminum monoalkyldihalides, aluminum alkylsesquihalides, aluminum alkenyls, aluminum alkylenes, aluminum cycloalkyls, aluminum cycloalkylalkyls, aluminum aryls, aluminum alkylaryls, and complexes of the organometallic compounds above mentioned with preferably weak Lewis bases.

Organometallic compounds in which the metal is linked by main valences not only to carbon and/or halogen atoms, but also to oxygen atoms linked to an organic group such as aluminum dialkylalkoxides and aluminum alkylalkoxyhalides, can also be employed.

Non-restrictive examples of useful organometallic compounds include: beryllium dimethyl, beryllium methylchloride, beryllium diethyl, aluminum triethyl, aluminum triisobutyl, aluminum trihexyl, aluminum diethylmonochloride, aluminum diethylmonoiodide, aluminum diethylmonofluoride, aluminum diisobutylmonochloride, aluminum monoethyldichloride, aluminum ethylsesquichloride, aluminum butenyldiethyl, aluminum isohexenyldiethyl, 1-methyl-1,4 di(diisobutylaluminum) butane, aluminum tri(dimethylcyclopentylmethyl), aluminum triphenyl, aluminum tritolyl, aluminum di(cyclopentylmethyl) monochloride, aluminum diphenyl monochloride, aluminum diisobutylmonochloride complexed with anisole, aluminum monochloro monoethylmonoethoxide, aluminum diethylpropoxide, aluminum diethylamyloxide, aluminum monochloromonopropylmonopropoxide.

The vanadium compounds used as other catalyst-forming components are preferably those which are soluble in the hydrocarbons usable as the copolymerization medium. These include the halides and oxyhalides (such as e.g. $VCl_4$, $VOCl_3$ $VBr$) and compounds in which at least one of the metal valences is saturated by a hetero-atom (in particular oxygen or nitrogen) linked to an organic groups, such as vanadium triacetylacetonate and tribenzoylacetonate, vanadyl diacetylacetonate, halogenacetylacetonates, trialcoholates and haloalcoholates; tetrahydrofuranates, etherates, aminates, pyridinates and quinolinates of vanadium tri- and tetrachloride and of vanadyl trichloride. Hydrocarbon-insoluble vanadium compounds selected from among organic salts such as e.g. vanadium triacetate, tribenzoate and tristearate can also be employed.

In practice we have found that in order to obtain the best results, the catalytic systems should contain halogen atoms, wherein at least one of the constituents contains at least one halogen atom.

All of the above-mentioned organometallic compounds can be used in the preparation of the catalyst when the vanadium compound is a halide or oxyhalide. On the other hand, when vanadium compounds in which at least one of the metal valences is saturated by an oxygen or nitrogen atom linked to an organic group are used, we have found that the best results are obtained by employing halogen-containing organometallic compounds in the preparation of the catalyst.

The copolymerization can be carried out at temperatures ranging from $-80°$ C. to $+125°$ C.

When catalysts prepared from vanadium triacetylacetonate or vanadyl diacetylacetonates, haloacetylacetonates, or in general from a vanadium compound in the presence of aluminum alkylhalides are used, it is desirable to both prepare the catalyst and carry out the copolymerization at temperatures ranging between $0°$ C. and $-80°$ C. preferably between $-10°$ C. and $-50°$ C., in order to obtain high copolymer yields per weight unit of the catalyst used.

By operating under these conditions the catalysts show a much higher activity than the same catalytic systems prepared and employed at higher temperatures. Furthermore, by operating in the above mentioned low temperature range, the activity of the catalysts remains practically unaltered with time.

When catalyst obtained from vanadium triacetylacetonate, vanadyl trialcoholates or haloalcoholates and aluminum alkylhalides are used at temperatures ranging from $0°$ C. to $+125°$ C., to obtain high copolymer yield it is necessary to operate in the presence of particular complexing agents, selected from among ethers, thioethers, tertiary amines or trisubstituted phosphines containing at least a branched alkyl group or an aromatic nucleus.

The complexing agent can be an ether of the formula RYR′ where Y is oxygen or sulphur and R and R′ represent a linear or branched alkyl group containing 1 to 14 carbon atoms, or an aromatic group containing 6 to 14 carbon atoms, at least one of R and R′ being a branched alkyl group or an aromatic nucleus. The complexing agent can also be a tertiary amine of the formula:

wherein each R, R′ and R″ represents an alkyl group containing 1 to 14 carbon atoms or an aromatic nucleus containing 6 to 14 carbon atoms, at least one of the three substituents being an aromatic nucleus. The complexing agent can also be a tertiary phosphine of the formula:

wherein R, R' and R" each represents an alkyl radical containing 1 to 14 carbon atoms or an aromatic nucleus containing 6 to 14 carbon atoms, at least one of the three substituents being an aromatic nucleus. The amount of complexing agent is preferably comprised between 0.05 and 1 mole of aluminum alkylhalide.

The activity of the catalysts used in the process herein described varies with the molar ratio between the compounds employed in the preparation of the catalyst.

In case, e.g., aluminum trialkyls and vanadium halides or oxyhalides are used, it is convenient to employ catalysts wherein the ratio between the moles of aluminum trialkyl and the moles of vanadium compound ranges from 1 to 5, preferably from 2 to 4; whereas when aluminum diethylmonochloride [Al(C$_2$H$_5$)$_2$Cl] and vanadium triacetylacetonate (VAc$_3$) are used, the best results are obtained with a molar ratio Al(C$_2$H$_5$)$_2$Cl/VAc$_3$ ranging from 2 to 20, preferably from 4 to 10.

The copolymerization can be carried out in the presence of an aliphatic, cycloaliphatic or aromatic hydrocarbon solvent consisting e.g. of butane, pentane, n-heptane, cyclohexene, toluene, xylene and mixtures thereof. Inert halogenated hydrocarbons such as, e.g., chloroform, trichloroethylene, chlorobenzenes, methylene chloride, dichloroethane, tetrachloroethylene etc. can be used as solvents.

Particularly high copolymerization rates can be achieved when the copolymerization is carried out in the absence of inert solvent by using the monomers in the liquid state, that is, e.g. by using an ethylene solution of the mixture of aliphatic olefins and cyclohexenonorbornenes to be copolymerized, which is kept in the liquid state.

In order to obtain copolymers having the most homogeneous composition, the ratio between the concentrations of the monomers to be copolymerized present in the liquid reacting phase should be maintained constant or at least as constant as possible during the copolymerization reaction. To this end the copolymerization may be advantageously effected continuously by continuously feeding and dicharging a monomer mixture having constant composition and by operating at high space velocities.

By varying the composition of the monomer mixture, the composition of the copolymers can be changed within wide ranges. If amorphous copolymers of cyclohexenonorbornenes with ethylene and propylene are desired, as is generally the case, a molar ratio of ethylene and propylene lower than or at most equal to 1:4 is maintained in the reacting liquid phase; this corresponds to a molar ratio of ethylene to propylene in the gaseous phase lower than or, at most equal, to 1:1, under normal conditions. Molar ratios between 1:200 and 1:4 in the liquid phase are normally preferred.

When butene-1 is used instead of propylene, the molar ratio of ethylene to butene maintained in the liquid phase must be lower, or at most equal to 1:20, which corresponds to an ethylene-butene-1 molar ratio in the gas phase lower or, at most, equal to 1:1.5, under normal conditions. Molar ratios in the liquid phase ranging from 1:1000 to 1:20 are normally preferred. By operating under these conditions, amorphous copolymers are obtained containing less than about 75% by mols of ethylene. When these values are surpassed, the copolymer exhibits crystallinity of polyethylenic type.

The lower limit of the ethylene content is not critical; the copolymers should however preferably contain at least 5% by mols of ethylene. The alpha-olefin content can preferably vary between a minimum of 5% and a maximum of 95% by mols. The diolefin content in the copolymer preferably ranges from 0.1 to 20% by mols. This upper limit can be raised, but especially for economic reasons it is not convenient to introduce into the copolymer a diene content higher than 20% by mols, and in the case of the particular diolefins used in the practice of this invention it is unnecessary to use more than 20% by mols thereof in order to obtain good vulcanization of the terpolymers in short vulcanization times.

The following examples are given to illustrate the invention in detail without limiting its scope.

Example 1

The reaction apparatus consists of a 3,500 cc. glass cylinder having 10 cm. diameter, provided with a stirrer and gas inlet and outlet tubes. The inlet tube extends to the bottom of the cylinder and terminates in a porous plate (5 cm. diameter). Into the apparatus kept at the constant temperature of —20° C., 2,100 cc. anhydrous n-heptane and 1.5 cc. of 5,6-cyclohexeno-3'-norbornene-2 (tricyclo - [6,2,1,0$^{2-7}$]undecadiene - 4-9) are introduced. Through the gas inlet tube a propylene-ethylene mixture having molar ratio 2:1 is sent in and circulated at a rate of 1200 Nl./h.

In a 100 cc. flask, the catalyst is preformed by operating at —20° C. under nitrogen and reacting 2 millimols vanadium tetrachloride and 10 millimols of aluminum ethylsesquichloride [½Al$_2$(C$_2$H$_5$)$_3$Cl$_3$] in 25 cc. anhydrous n-heptane. The catalyst thus prepared is siphoned into the reactor by means of nitrogen pressure. The ethylene-propylene mixture is continuously fed and discharged at a rate of 200 Nl./h.

One minute after introduction of the catalyst, the reaction is stopped by adding 10 cc. of methanol containing 0.1 of phenyl-beta-naphthylamine. The product is purified in a separatory funnel by means of repeated treatments with dilute hydrochloric acid and successively with water and then coagulated in acetone.

After vacuum drying, there are obtained 30 g. of a solid terpolymerizate, amorphous when subjected to X-ray examination, which looks like an unvulcanized elastomer and is completely soluble in boiling n-heptane.

Analysis by infrared spectrography shows the presence of unsaturations (area between 6 and 6.5 microns). The propylene content is 55% by weight. Mooney viscosity ML(1+4) at 100° C. is 127.

100 parts by weight of the terpolymer are mixed on a laboratory roll mixer with 50 parts HAF carbon black, 1 part of phenyl-beta-naphthylamine, 2 parts of sulphur, 5 parts of zinc oxide, 1 part of tetramethylthiuram disulphide and 0.5 part of mercaptobenzothiazole.

The mix is vulcanized in a press for 60 minutes at 150° C. A vulcanized sheet having the following characteristics is obtained:

Tensile strength _____ kg./cm.$^2$__ 149
Elongation at break _____ percent__ 340
Modulus at 300% _____ kg./cm.$^2$__ 131
Permanent set at break _____ percent__ 12

Example 2

Into reaction apparatus as described in Example 1, kept at the constant temperature of —20° C., 1050 cc. of anhydrous n-heptane and 1 cc. of 5,6-cyclohexeno-3'-norbornene-2-(tricyclo[6,2,1,0$^{2-7}$]undecadiene-4-9) are introduced. Through the gas inlet tube a propylene-ethylene mixture having molar ratio 3:1 is sent in and circulated at a rate of 600 Nl./h.

In a 100 cc. flask the catalyst is preformed by operating at —20° C. under nitrogen and reacting 1.5 millimols vanadium oxytrichloride and 7.5 millimols aluminum ethylsesquichloride[½Al$_2$(C$_2$H$_5$)$_3$Cl$_3$] in 50 cc. n-heptane. The catalyst thus preformed is siphoned into the reactor by means of nitrogen pressure. The ethylene-propylene mixture is continuously fed and discharged at a rate of 600 Nl./h.

Two minutes after addition of the catalyst, the reaction is stopped by adding 10 cc. methanol containing 0.1 phenyl-beta-naphthylamine. The product is purified and isolated as described in Example 1. After vacuum drying there are obtained 11 g. of a solid terpolymerizate, which is amorphous on X-ray examination, looks like an unvulcanized elastomer, and is completely soluble in boiling n-heptane.

Analysis of said terpolymerizate by infrared spectrography shows the presence of unsaturations (area between 6 and 6.5 microns). The propylene content is 53% by weight.

100 parts of the terpolymer are vulcanized as described in Example 1. A vulcanized sheet is obtained, showing the following characteristics:

Tensile strength _____kg./cm.$^2$__ 147
Elongation at break _____percent__ 310
Modulus at 300% _____kg./cm.$^2$__ 142
Permanent set at break _____percent__ 8

Example 3

Into reaction apparatus as described in Example 1, kept at −20° C., there are introduced 2.1 l anhydrous n-heptane and 3.5 cc. of 3′-methyl-5,6-cyclohexeno-3′-normornene - 2(4 - methyl - tricyclo[6,2,1,0$^{2-7}$]undecadiene-4-9). Through the gas inlet tube an ethylene-propylene mixture having molar ratio 1:2 is injected and circulated at a rate of 1,200 Nl./h. The catalyst is preformed in a 100 cc. flask by operating at −20° C. under nitrogen and reacting 3-millimols vanadium tetrachloride and 15 millimols aluminum ethylsesquichloride [½Al$_2$(C$_2$H$_5$)$_3$Cl$_3$] in 60 cc. n-heptane. The ethylene-propylene mixture is continuously fed and discharged at a rate of 600 Nl./h. After 8 minutes the reaction is stopped by adding 100 cc. of methanol containing 0.1 g. of phenyl-beta-naphthylamine. The product is purified and isolated as described in Example 1. After vacuum drying, there are obtained 60 g. of solid terpolymerizate which is amorphous on X-ray examination. It looks like an unvulcanized elastomer and is completely soluble in boiling n-heptane. Analysis by infrared spectrography shows the presence of unsaturation (band at 12.5 microns). The propylene content is 60% by weight, Mooney viscosity ML (1+4) at 100° C.=147.

100 parts by weight of the terpolymer are cured as described in Example 1, and for various times. The properties of the vulcanizates are given in the following table:

| Time (minutes) | 15 | 30 | 60 | 90 | 120 | 240 |
|---|---|---|---|---|---|---|
| Tensile strength (kg./cm.$^2$) | 171 | 186 | 176 | 166 | 180 | 181 |
| Elongation at break, percent | 400 | 330 | 300 | 280 | 300 | 300 |
| Modulus at 300% (kg./cm.$^2$) | 125 | 165 | 176 | | 180 | 181 |
| Permanent set, percent | 20 | 12 | 10 | 8 | 8 | 8 |

70 parts by weight of the terpolymer admixed with 30 parts of naphthenic oil (Circosol 2XH) are vulcanized at 150° C. with the same mix for different times. The product, prior to the vulcanization, now had a Mooney viscosity ML(1+4) at 100° C. of 106. The properties of the vulcanizates are the following:

| Time (minutes) | 15 | 30 | 60 | 90 | 120 | 240 |
|---|---|---|---|---|---|---|
| Tensile strength (kg./cm.$^2$) | 140 | 149 | 155 | 156 | 148 | 145 |
| Elongation at break, percent | 560 | 460 | 420 | 370 | 400 | 360 |
| Modulus at 300% | 72 | 98 | 112 | 120 | 110 | 122 |

Example 4

Into reaction apparatus as described in Example 1, kept at −20° C., 1050 cc. of anhydrous n-heptane and 1.5 cc. of 3′-methyl-5,6-cyclohexeno-3′-norbornene-2(4-methyl-tricyclo[6,2,1,0$^{2-7}$]undecadiene 4-9) are introduced. Through the gas inlet tube a gaseous propylene-ethylene mixture having molar ratio 3:1 is sent in and circulated at a rate of 600 Nl./h.

The catalyst is preformed in a 100 cc. flask by operating at −20° C. under nitrogen and reacting 1.5 millimols vanadium oxythichloride and 7.5 millimols aluminum ethylsesquichloride[½Al$_2$(C$_2$H$_5$)$_3$Cl$_3$] in 60 cc. n-heptane.

The catalyst thus prepared is siphoned into the reactor by means of nitrogen pressure. The propylene-ethylene mixture is continuously fed and discharged at a rate of 600 Nl./h. After 6 minutes the reaction is stopped by the addition of 10 cc. methanol containing 0.1 g. phenyl-beta-naphthylamine. The product is purified and isolated as described in Example 1. After vacuum drying there are obtained 21.2 g. of a solid terpolymerizate which is amorphous on X-ray examination, looks like an unvulcanized elastomer and is completely soluble in boiling n-heptane.

Examination by infrared spectrography shows the presence of unsaturations (band at 12.5 microns). The propylene content is 52% by weight. Mooney viscosity ML(1+4) at 100° C. is 129.

100 parts by weight of terpolymer are cured with the same mix as in Example 1 and for different times. The properties of the vulcanizates are shown in the following table:

| Time (minutes) | 15 | 30 | 60 | 90 | 120 | 240 |
|---|---|---|---|---|---|---|
| Tensile strength (kg./cm.$^2$) | 196 | 188 | 193 | 198 | 196 | 186 |
| Elongation at break, percent | 450 | 340 | 300 | 320 | 320 | 300 |
| Modulus at 300% (kg./cm.$^2$) | 128 | 166 | 193 | 191 | 184 | 186 |
| Permanent set, percent | 14 | 10 | 8 | 8 | 8 | 8 |

Example 5

In to reaction apparatus as described in Example 1, kept at −20° C., there are introduced 1050 cc. of anhydrous n-heptane and 1 cc. of 3′-methyl-5,6-cyclohexeno-3′ - norbornene - 2(4 - methyl - tricyclo - [6,2,1,0$^{2-7}$] undecadiene 4-9). A gaseous ethylene-propylene mixture having molar ratio 1:3 is sent in through the gas inlet tube and circulated at a rate 600 N l./h.

The catalyst is preformed in a 100 cc. flask by operating at −20° C. under nitrogen and reacting 1.5 millimols vanadium oxytrichloride and 7.5 millimols aluminum diethylmonochloride in 50 cc. n-heptane. The catalyst thus prepared is siphoned into the reactor by means of nitrogent pressure. The ethylene-propylene mixture is continuously fed and discharged at a rate of 600 N l./h.

After 7 minutes, the reaction is stopped by adding 10 cc. methanol containing 0.1 g. phenyl-beta-naphthylamine. The product is purified and separated as described in Example 1. After vacuum drying, there are obtained 24.1 g. of solid terpolymerizate which is amorphous on X-ray examination, has the aspect of an unvulcanized elastomer and is completely soluble in boiling n-heptane. The examination by infrared spectrography shows the presence of unsaturations (band at 12.5 microns). The propylene content is 56% by weight. Mooney viscosity ML(1+4) at 100° C. is 57.

100 parts by weight of the terpolymer are vulcanized with the same mix and according to the same procedure as in Example 1 and for various times. The properties of the vulcanizate are given in the following table:

| Time (minutes) | 15 | 30 | 60 | 90 | 120 | 240 |
|---|---|---|---|---|---|---|
| Tensile strength (kg./cm.$^2$) | 123 | 138 | 156 | 152 | 145 | 130 |
| Elongation at break, percent | 540 | 440 | 450 | 400 | 380 | 360 |
| Modulus at 300% (kg./cm.$^2$) | 64 | 94 | 104 | 112 | 108 | 109 |

Example 6

Into reaction apparatus as described in Example 1, there are introduced 1050 cc. of anhydrous n-heptane and 2 cc. of 3′,4′dimethyl-5,6-cyclohexeno-3-norbornene-2(4,5 dimethyl-tricyclo[6,2,1,0$^{2-7}$] undecadiene 4-9). A gaseous ethylene-propylene mixture having molar ratio 1:2 is sent in through the gas inlet tube and circulated at a rate of 600 N l./h.

The catalyst is preformed in a 100 cc. flask by reacting 1.5 millimols vanadium tetrachloride and 7.5 millimols aluminum ethylsesquichloride [½Al$_2$(C$_2$H$_5$)$_3$Cl$_3$] in 50 cc. n-heptane.

The catalyst thus prepared is siphoned into the reactor by means of nitrogen pressure. The ethylene-propylene mixture is continuously fed and discharged at a rate of 600 N l./h. After 6 minutes the reaction is stopped by addition of 10 cc. of methanol containing 0.1 g. of phenyl-beta-naphthylamine. The product is purified and isolated as described in Example 1. After vacuum drying, there obtained 31.8 g. of a solid terpolymer which is amorphous when subjected to the X-ray examination, looks like a unvulcanized elastomer and is completely soluble in boiling n-heptane. Analysis by IR spectography shows hte presence of 55% propylene by weight; the Mooney viscosity ML (1+4) at 100° C. is 110. 100 parts of terpolymer are cured with the same mix of Example 1 and for various times. The properties of the vulcanizate are shown in the following table:

| Time (minutes) | 15 | 30 | 60 | 90 | 120 | 240 |
|---|---|---|---|---|---|---|
| Tensile strength (kg./cm.$^2$) | 208 | 227 | 223 | 219 | 200 | 192 |
| Elongation at break, percent | 640 | 510 | 420 | 400 | 360 | 380 |
| Modulus at 300% (kg./cm.$^2$) | 84 | 123 | 154 | 163 | 159 | 146 |

Example 7

Reaction apparatus as described in Example 1 is used. It is kept at −20° C., and 1050 cc. anhydrous n-heptane and 2 cc. of 3′,4′ dimethyl-5,6-cyclohexeno-3′-norbornene-2(4,5 dimethyl-tricyclo [6,2,1,0$^{2-7}$] undecadiene 4-9) are placed therein. A gaseous ethylene-propylene mixture having molar ratio 1:3 is sent in through the gas inlet tube and circulated at a rate of 600 N l./h.

The catalyst is preformed in a 100 cc. flask by operating at −20° C. under nitrogen and reacting 1.5 millimols vanadium oxytrichloride and 7.5 millimols aluminum ethylsesquichloride [½Al$_2$(C$_2$H$_5$)$_3$] in 50 cc. n-heptane.

The catalyst thus prepared is siphoned into the reactor by means of nitrogen pressure. The gaseous ethylene-propylene mixture is continuously fed and discharged at a rate of 600 N l./h. After 9 minutes, the reaction is stopped by adding 10 cc. of methanol containing 0.1 g. phenyl-beta-naphthylamine. The product is purified and isolated as described in Example 1.

After vacuum drying, there are obtained 33.3 g. of a solid terpolymerizate which is amorphous on X-ray examination, looks like an unvulcanized elastomer and is completely soluble in boiling n-heptane. Analysis by infrared spectography shows the presence of 58% propylene by weight; the Mooney viscosity ML(1+4) at 100° C. is 89.

100 parts by weight of the terpolymer are vulcanized with the same mix used in Example 1 far various times. The properties of the vulcanizates are shown in the following table:

| Time (minutes) | 15 | 30 | 60 | 90 | 120 | 240 |
|---|---|---|---|---|---|---|
| Tensile strength (kg./cm.$^2$) | 156 | 190 | 184 | 190 | 163 | 149 |
| Elongation at break, percent | 570 | 500 | 400 | 380 | 340 | 320 |
| Modulus at 300% (kg./cm.$^2$) | 76 | 116 | 143 | 149 | 148 | 141 |

Example 8

The reaction apparatus consists of a 1.5 l. glass autoclave, provided with a stirrer and a gas feed tube. Into the autoclave, kept at the constant temperature of −10° C., there are introduced 1000 cc. liquid propylene and 8 cc. of 3 - methyl-5,6-cyclohexeno-3′-norbornene-2(4-methyl-tricyclo 6,2,1,0$^{2-7}$] undecadiene 4-9). Ethylene is added up to a pressure of 0.9 atm.

The catalyst components are introduced into the reactor from two separate metering devices, first 2 millimols of aluminum diethylmonochloride dissolved in 2 cc. of anhydrous n-heptane, then 0.4 millimol of vanadium tetrachloride dissolved in 4 cc. anhydrous n-heptane. The polymerization starts immediately to form a product insoluble in the reaction medium. The temperature is kept at −10 C. and pressure is maintained constant by re-feeding the ethylene absorbed during the polymerization. After 60 minutes, the reaction is stopped. The unreacted olefins are removed, and the product is purified and isolated as described in Example 1.

After vacuum drying, there are obtained 70 g. of a solid terpolymerizate which is amorphous on X-ray examination, looks like an unvulcanized elastomer and is completely soluble in boiling n-heptane. The Mooney viscosity ML(1+4) measured at 100° C. is 105. Examination by infrared spectrography shows the presence of unsaturations (band at 12.5 microns).

100 parts by weight of the terpolymer are vulcanized with the same mix as in Example 1 for 60 minutes at 150° C. A vulcanized sheet having the following characteristics is obtained:

Tensile strength _____ kg./cm.$^2$__ 157
Elongation at break _____ percent__ 380
Modulus at 300% _____ kg./cm.$^2$__ 137

As will be apparent, changes in details may be made in practicing this invention without departing from the spirit thereof. It is intended, therefore, to include in the scope of the appended claims all such variations as will be obvious to those skilled in the art from the description and illustrative working examples given herein.

What is claimed is:

1. Substantially linear, amorphous, unsaturated, high molecular weight copolymers of at least one cyclohexeno-norbornene with ethylene and at least one aliphatic alpha-olefin of the general formula R—CH=CH$_2$, wherein R is an alkyl group containing 1 to 6 carbon atoms, said copolymers consisting of macromolecules containing unsaturations and made up of randomly distributed units of each of the starting monomers, and containing from about 5% to about 75% by mols of polymerized ethylene, from about 0.1% to about 20% by mols of polymerized cyclohexenonorbornene and the balance polymerized higher alpha-olefin.

2. Copolymers according to claim 1, consisting of macromolecules containing polymerized units of ethylene, polymerized units of at least one of the aliphatic alpha-olefins, and polymerized units of at least one monomer selected from the group consisting of 5,6-cyclohexeno-3′-norbornene-2; 3′-methyl-5,6-cyclohexeno-3′-norbornene-2; and 3′,4′ dimethyl-5,6-cyclohexeno-3′-norbornene-2.

3. Copolymers according to claim 1, consisting of macromolecules containing polymerized units of ethylene, polymerized units of propylene, and polymerized units of at least one monomer selected from the group consisting of 5,6-cyclohexen-3′-norbornene-2; 3-methyl-5,6-cyclohexeno-3′-norbornene-2; and 3′,4′ dimethyl-5,6-cyclohexeno-3′-norbornene-2.

4. Process for the preparation of copolymers according to claim 1, characterized in that a mixture of the selected monomers to be copolymerized is subjected to copolymerizing conditions in contact with a catalyst obtained from:
 (a) vanadium compounds and
 (b) organometallic compounds of metals selected from the group consisting of beryllium and aluminum.

5. Process according to claim 4 characterized in that at least one of the catalyst components contains at least one halogen atom.

6. Process according to claim 4 characterized in that the catalyst is obtained from hydrocarbon soluble vanadium compounds selected from the group consisting of vanadium halides and oxyhalides and vanadium compounds in which at least one of the metal valences is saturated by a heteroatom in particular oxygen or nitrogen, linked to an organic group.

7. Process according to claim 4, characterized in that the catalyst is obtained from hydrocarbon-insoluble vanadium compounds selected from the group consisting of vanadium triacetate, vanadium tribenzoate and vanadium tristearate.

8. Process according to claim 4, characterized in that the catalyst is obtained from an organometallic compound selected from the group consisting of aluminum trialkyls, aluminum dialkylmonohalides, aluminum monoalkyldihalides, aluminum alkylsesquihalides, aluminum alkenyls, aluminum alkylenes, aluminum cycloalkyls, aluminum cycloalkylalkyls, aluminum aryls, aluminum alkylaryls, aluminum alkylalkoxides, aluminum alkylalkoxyhalides, complexes of said aluminum organic compounds with preferably weak Lewis bases, beryllium dialkyls, beryllium alkylhalides and beryllium diaryls.

9. Process according to claim 4, characterized in that the catalyst is obtained from:
   (a) a vanadium halogenated compound and
   (b) a substance selected from the group consisting of halogen-free and halogen-containing organometallic compounds of aluminum and beryllium.

10. Process according to claim 4 characterized in that the catalyst is obtained from:
    (a) a halogen-free vanadium compound, and
    (b) a substance selected from the group consisting of halogen-containing organometallic compounds of aluminum and beryllium.

11. Process according to claim 4, characterized in that the polymerization is carried out at temperatures ranging from —80 to 125° C.

12. Process according to claim 4, characterized in that the polymerization is carried out at temperatures between 0 and —80° C., preferably between —10° and —50° C.

13. Process according to claim 4, characterized in that a catalyst obtained from a vanadium compound selected from the group consisting of vanadium triacetylacetonate, vanadyl trialcoholates and haloalcoholates and from an aluminum alkylhalide is used at temperatures ranging from 0 to 125° C. in the presence of a complexing agent selected from the group consisting of ethers, thioethers, tertiary amines and trisubstituted phosphines containing at least one member from the group consisting of branched alkyl groups and aromatic groups, the amount of the complexing agent used being in the range from 0.05 to 1 mole per mole of the aluminum alkylhalide.

14. Process according to claim 4, characterized in that catalysts are used which are obtained from aluminum trialkyls and vanadium compounds selected from the group consisting of vanadium halides and vanadium oxyhalides, and in which the molar ratio of aluminum trialkyl to vanadium compound is from 1 to 5.

15. Process according to claim 4, characterized in that a catalyst is used which is obtained from aluminum diethylmonochloride and vanadium triacetylacetonate and the molar ratio of aluminum diethylmonochloride to vanadium triacetylacetonate is from 2 to 20.

16. Process according to claim 4, characterized in that the copolymerization is carried out with the monomers in the liquid state, in the absence of an inert solvent.

17. The process according to claim 4, characterized in that the copolymerization is carried out in an inert liquid medium selected from the group consisting of hydrocarbon solvents and halogenated hydrocarbon solvents.

18. Process for preparing a copolymer of at least one of the cyclohexenonorbornenes with ethylene and propylene according to claim 4, characterized in that the molar ratio propylene/ethylene maintained in the liquid base is at least 4:1.

19. Process for the preparation of a copolymer of at least one of the cyclohexenonorbornenes with ethylene and butene-1 according to claim 4, characterized in that the molar ratio butene-1/ethylene maintained in the liquid phase is at least 20:1.

20. Copolymers according to claim 1, sulfur-vulcanized to elastomers.

21. Manufactured articles obtained by shaping a mass comprising an elastomer according to claim 20.

References Cited
UNITED STATES PATENTS

| | | | |
|---|---|---|---|
| 3,418,299 | 12/1968 | Beneodikter | 260—85.3 |
| 3,211,709 | 10/1965 | Adamek | 260—80.78 |

JOSEPH L. SCHOFER, Primary Examiner

R. S. BENJAMIN, Assistant Examiner

U.S. Cl. X.R.
260—80.78, 88.2, 666

UNITED STATES PATENT OFFICE
CERTIFICATE OF CORRECTION

Patent No. 3,467,631                    Dated September 16, 1969

Inventor(s) Alberto Valvassori et al

It is certified that error appears in the above-identified patent and that said Letters Patent are hereby corrected as shown below:

Col. 1, line 15, "Natta et al" omitted after "modified".

Col. 4, lines 9, "VCl$_4$, VOCl$_3$ VBr)" should read - -VCl$_4$, VOCl$_3$ VBr line 12, "groups" should read - - -group- - - line 50, "catalyst" should read - -catalysts- - -.

Col. 5, line 47, "dicharging" should read - -discharging- -;

Col. 6, line 51, "part" should read - - -parts- - -;

Col. 7, lines 24 and 25, "nor-mornene-2 etc." should read - -nor-bor ene-2 etc. - - line 34, "100 cc" should read - -10 cc- -

Col. 8, line 1, "oxythichloride" should read - -oxytrichloride- - .

Col. 9, line 7 and 8, "are" omitted after - -there- -;

line 33, "[1/2 Al$_2$(C$_2$H$_5$)$_3$" should read [1/2Al$_2$(C$_2$H$_5$)$_3$Cl$_3$] ;

line 45, "spectrography" should read - -spectography- -;

line 64, bracket omitted before "6.2.1.0$^{2-7}$ ] ;

Page 2

UNITED STATES PATENT OFFICE
CERTIFICATE OF CORRECTION

Patent No. 3,467,631                               Dated September 16, 1969

Inventor(s)   Alberto Valvassori et al

It is certified that error appears in the above-identified patent and that said Letters Patent are hereby corrected as shown below:

Col. 9, line 69, "millimol" should read - - -millimols- - -;

line 73, "small ° between 10 and C" omitted.

Col. 12 of printed patent under "References Cited" "Beneodikter" should read - - -Benedikter- - -.

Signed and sealed this 5th day of November 1974.

(SEAL)
Attest:

McCOY M. GIBSON JR.
Attesting Officer

C. MARSHALL DANN
Commissioner of Patents